Oct. 16, 1962 W. J. FRANKTON ET AL 3,059,068

CARRIER CURRENT COMMUNICATION SYSTEMS INCORPORATING REPEATERS

Filed June 27, 1960

United States Patent Office 3,059,068

Patented Oct. 16, 1962

3,059,068

CARRIER CURRENT COMMUNICATION SYSTEMS INCORPORATING REPEATERS

William Jesse Frankton, Walter Norman Roseway, Geoffrey Atkinson, and William John Archibald, all of London, England, assignors to International Standard Electric Corporation, New York, N.Y.

Filed June 27, 1960, Ser. No. 39,175
7 Claims. (Cl. 179—175.31)

This invention relates to improvements in electric carrier current communication systems incorporating repeaters, with particular reference to supervisory arrangements therefor.

In carrier current systems operated over long submarine cables where submerged repeaters are used, an important feature of any supervisory arrangements provided is one that enables individual repeaters to be identified and tested from one or other of the attended stations terminating a section of repeatered cable. Such testing includes gain measurements and noise or harmonic generation or intermodulation measurements as guides to the state of operation or of deterioration or incipient failure of a repeater.

Various frequency—selection methods based on the provision of a range of frequencies and a corresponding range of electrical filters (one of each allocated to a repeater) have already been proposed, and in one particular system, described in British patent specification No. 656,188 issued in November 1951, to F. O. Roe 2, frequency doubling is employed in the process. In this known system, there is provided a two-way electric carrier current communication system comprising two attended stations connected by a single communication path in which are included two or more unattended repeaters, in which different frequency bands are used for conveying signals in the two directions between the attended stations, and in which there is provided for the purpose of testing each repeater individually from an attended station, means for transmitting over the said communication path from that station a test current having a frequency corresponding to a given repeater and lying in one of the said frequency bands, means at the given repeater for generating in response to the receipt of the test current a response current having a different frequency which also lies in one of the said frequency bands, and means for transmitting the response current to one of the attended stations over the said communication path.

In the statement set out in the preceding paragraph, the term "communication path" means any communication medium (for example, a cable circuit or radio connection) over which signals may be electrically conveyed, and the invention is not to be regarded as restricted to submarine cable systems or other cable systems.

In this arrangement, a particular frequency *fn* individual to repeater N travels in one (e.g. lower) frequency band via all the repeaters in the system, but at repeater N it is picked off by a narrow band pass filter after its passage through the repeater, is distorted in a frequency multiplier (or divider), and a second narrow filter selects the first upper (or lower) harmonic, returning it to the system at the input to the repeater, and being now in the other (e.g. upper) band of transmission, it is returned to the sending station, where its level is a measure of the repeater characteristic.

The usefulness of such a system—to be referred to herein "as of the type set forth"—can be readily extended, with little extra expense per repeater, to permit a noise generation measurement to be made for each repeater at the same time, since such a measurement is a useful guide to the condition of the amplifier in the repeater. Harmonic generation and intermodulation measurements may also be readily made. According therefore, to the present invention, equipment is provided for testing a line amplifier in a repeater of a two-way electric carrier current communication system of the type set forth, which comprises an auxiliary amplifier at the repeater, first means for applying to the input of said auxiliary amplifier test current characteristic of said repeater after selection at the output of the said line amplifier, means for connecting the output of said auxiliary amplifier to an auxiliary modulator at said repeater, means for selecting from the output circuit of the said line amplifier a narrow band of frequencies constituting a sample of the frequencies there present, in a region above the normal transmission range of the system and repeaters, means for applying said sample band to said modulator for modulation with frequency received from said auxiliary amplifier, means for selecting from said modulator a band of modulation products therein developed and lying within the normal transmission range of the system and repeaters, and means for feeding said selected band of products to the input of the repeater for transmission to one of the attended stations.

According to a different aspect, the invention consists in a system for supervising the performance of a single telecommunication path and spaced-apart repeaters connected in the path, in which there are provided means at one end of the said path for transmitting different frequencies over the path and its repeaters each of which frequencies is characteristic of a different one of the said repeaters, together with means at a repeater for selecting from the frequencies present on the path the frequency which is characteristic of that repeater, means for causing such frequency or a derivation thereof to be applied to an auxiliary modulator associated with that repeater, a filter associated with the repeater for selecting from the spectrum of frequencies in the output of the amplifier of the repeater a sample band of frequencies in a region where the amplifier gain is still rising, or is at least steady, whereas path attenuation has risen markedly beyond the point at which it has ceased to be equalised in well-known manner, further means for applying this sample band of frequencies to the modulator, a filter for selecting from the output products of the modulator resulting from the application thereto of the characteristic frequency of the repeater and the sample band, a band of major modulation products lying within the transmission range of the communication path and its repeaters, and means for feeding back said band into the system for return to one end of the communication path for measurement.

The basic noise generated by an amplifier is a heterofrequency signal extending over the whole working range of the amplifier, and at a level, at a particular frequency, dependent on the gain of the amplifier at that frequency. The noise energy in the repeater output is thus uniformly distributed over the whole working frequency spectrum of the amplifier (so-called "white noise"), and for measurement purposes, a sample of the noise, in a restricted frequency band, may be selected from any portion of the spectrum.

It should be noted that the sample so selected may constitute such "white noise," but may equally comprise harmonics or intermodulation products generated in the amplifier from one or more applied frequencies, and should be so regarded as extending thereto.

Practical considerations will generally determine the most favourable part of the spectrum from which to draw the sample, and it has been realised that if the region well above the highest frequency transmitted in the communication system is chosen, the communication path itself, being no longer equalised in this region for increasing attenuation with increasing frequency, will exert a useful degree of discrimination against incoming noise transmitted over the cable from earlier amplifiers in the system. That is to say, the noise measured at the output of an amplifier in a narrow band selected in this region will be primarily noise generated locally in the amplifier itself, with only a minor contribution from previous amplifiers, without the need for any band elimination filter or like device in the input circuit of the amplifier being measured.

The invention will be further described with reference to the accompanying drawings illustrating an embodiment. In the drawings.

Figure 1:
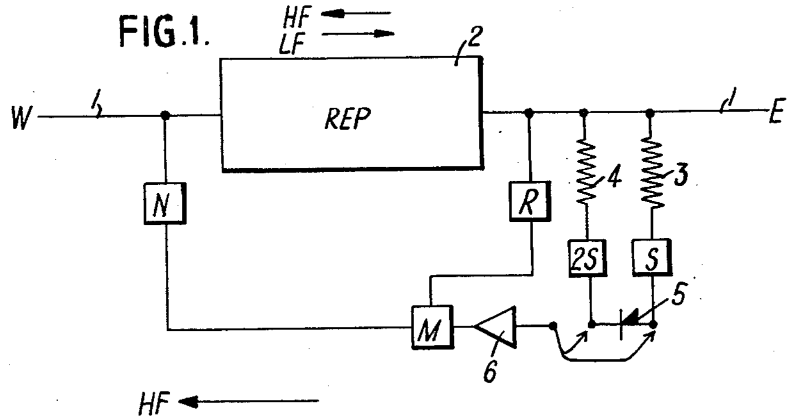
FIG. 1 shows in block form the basic arrangement adopted at an individual repeater station of a communication system.
Figures 2, 3:
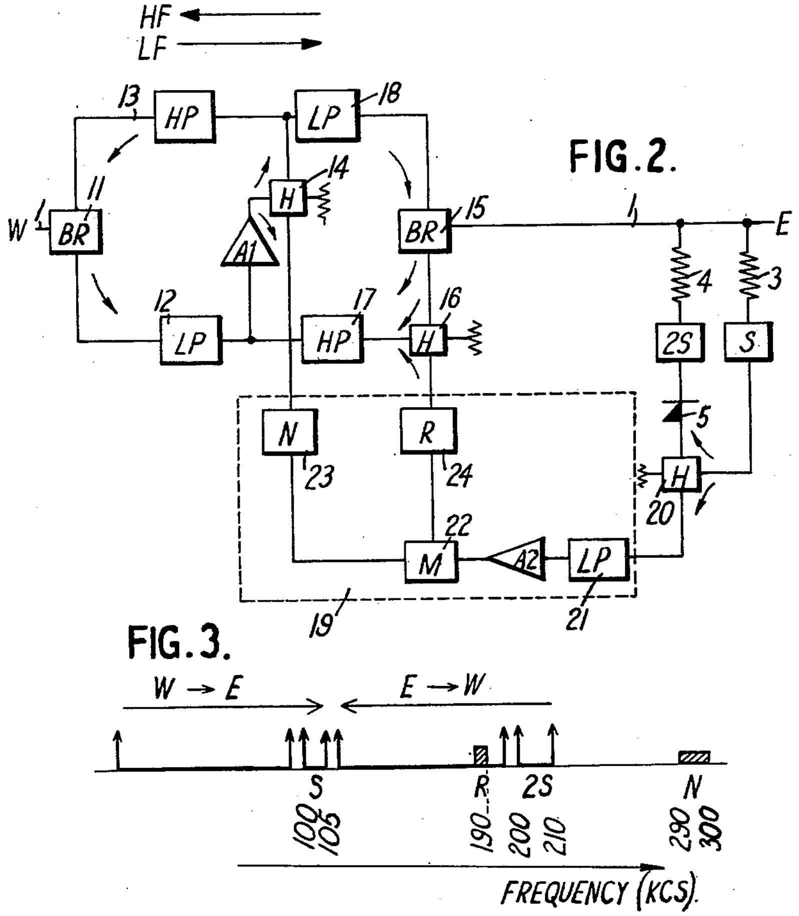
FIG. 2 shows a particular embodiment in greater detail, through still in block form.
FIG. 3 shows frequency allocations for the embodiment of FIG. 2.

In FIG. 1, a two-way telecommunication cable 1, e.g. a coaxial cable, running west, W to east, E, has a two-way repeater 2 comprising an amplifier and high-and-low-pass direction separating filters, to be more fully illustrated in FIG. 2. Thus, the separate directions of transmission over the communication system are determined on a frequency basis, as indicated by the arrows HF and LF above the repeater (high frequency and low frequency respectively).

On the east side of the repeater, band pass filters S and 2S of a supervisory system as referred to above are tied to the cable via pick-off resistances 3 and 4 respectively which ensure low shunt loss to the cable at the pick-off points: pick-off attenuation for the incoming supervisory signal of frequency S, and application attenuation for the return supervisory signal of frequency 2S, are correspondingly high. Between the outputs of the two filters a frequency doubler 5 is connected, consisting quite simply of a rectifier, and a small, subsidiary amplifier 6, preferably using transistors, is arranged for connection at its input side into the S—2S circuit. The output of the amplifier is applied as one input to a modulator M (a frequency-changer), while the second input to this modulator is derived from the output of a band pass filter N which is connected to the cable at a point following the high frequency direction of the repeater. The output of the modulator is connected via a band pass filter R to the cable on the same side of the repeater as S and 2S: this is the input side of the repeater for the high frequency direction. Amplifier 6 is normally connected to the input side of the doubler 5 so as to receive frequency S, but may be connected to the output side so as to receive predominantly 2S.

In operation, when it is desired to test the line and repeaters up to and including repeater 2 for the loop transmission equivalent and repeater noise generation, test frequency S is sent from the west terminal in the low frequency direction, and appears at the output of repeater 2 at the E side to be picked off by resistor 3 and filter S. After passage through doubler 5, the products of the multiplication are presented to filter 2S which passes the second harmonic of S and feeds it back into the line at substantially the pick-off point. However, frequency 2S is appropriate to the high frequency direction of transmission and therefore is applied to the repeater at the input side for this direction, and is thus returned to the west terminal for measurement, and comparison with the level of the outgoing frequency.

The frequency S, available at the output of its filter as a substantially pure frequency, is thus available as "carrier frequency" for the modulator M after amplification to suitable level in the amplifier 6. The filter N samples the noise in the output of the repeater and is chosen to do this in a part of the frequency spectrum away from the normal transmission regions. The band so selected is passed to the modulator as "input frequency," and is there transformed in frequency to a range of modulation products of which the band R, falling in the higher frequency transmission path, is selected.

Details of a specific arrangement are shown in FIG. 2, with a proposed frequency allocation in FIG. 3. In FIG. 2, the repeater is shown as comprising a single amplifier A1 which amplifies the signals passing both ways. The cable 1 from the W side is connected to a frequency selective bridge 11, functioning as a hybrid device, one branch of which is connected through a low pass filter 12 to the input of the amplifier A1. The other branch of 11 is connected through a high pass filter 13 to the output of the amplifier via a hybrid network 14. The cable 1 leading to the E side of the system is connected to a second frequency selective bridge 15, one branch of which is connected to the input of amplifier A1 via a second hybrid network 16 and a second high pass filter 17, while the other branch of 15 is connected via a second low pass filter 18 and a second branch of the network 14 to the output of amplifier A1. Networks 14 and 16 are additional to the normal repeater equipment and serve for the application of the noise measuring equipment contained in the dashed rectangle 19. Filters 12 and 18 should be designed to pass frequencies below about 105 kc./s., and filters 13 and 77 frequencies above about 112 kc./s. Thus, signals in the lower frequency band pass from W to E over the path 11—12—A1—14—18—15, while signals in the upper frequency band pass from E to W over the path 15—16—17—A1—14—13—11. Such an arrangement, in its general form, is, of course, well known.

Hybrids 14 and 16 are of the "skew" variety, having low transmission loss in the main signal path for signals to and from the amplifier, and correspondingly high transmission loss in the side paths to the equipment 19.

Also attached to the cable on the E side are the supervisory filters, S and 2S with their respective pick-off resistors 3 and 4 and the frequency multiplier rectifier 5, the connection now being taken via a symmetrical hybrid 20 between S and rectifier 5, the second path of the hybrid also going off to equipment 19 to provide a source of carrier frequency therein.

The equipment in 19, commencing at the input from hybrid 20, comprises a low pass filter 21, and auxiliary amplifier A2, a modulator 22, and noise N and return filters R, 23 and 24 respectively. Filter 23 is connected to the output from hybrid 14, while filter 24 feeds into the hybrid 16. Amplifier A2 may be any kind of amplifier designed to raise supervisory frequency received from S to a suitable level to act as carrier in a conventional type of modulator, but is conveniently a transistor amplifier drawing such limited power as it needs from the general supplies received over the cable for the main transmission amplifier. With such an arrangement, the provision of a special amplifier within a submerged repeater housing ceases to be an embarrassment from the power supply point of view, as a valve amplifier for 40 db of gain, even at a single frequency, could well be.

In the embodiment chosen, which is that of a repeater in a low frequency, submerged repeater, coaxial cable system, the low frequency direction occupies the frequency range below about 100 kc./s., the high frequency direction occupies the frequency range above about 112 kc./s., the supervisory frequencies S occupy a range of 100 to 105 kc./s. at the upper end of the low frequency direction, the return supervisory frequencies 2S occupy a corresponding range of 200 to 210 kc./s. above the upper frequency transmission range, and a noise band in the output of the amplifier is selected in the range 290 to 300 kc./s., well above the upper frequency transmission range. After modulation of this noise band with a frequency in the S frequency band, a return band R of 10 kc./s., or a selected portion of this band R, at 190 kc./s., is returned to terminal W along with the upper frequency transmission range.

Such a noise selection scheme has many advantages. The amplifier noise itself is selected in a band N where the amplifier gain is still rising, so that the noise is at a substantial level, whereas the cable at this frequency has long since ceased to be equalised against rising loss with rising frequency, and is therefore effecting marked discriminatory attenuation on the noise from previous repeaters; and the position of the return band R near the upper end of the upper frequency transmission range, where the amplifier gains are high, ensures that the noise band R is not swamped in the general level of noise but is readily measurable at the W terminal.

Although an example with specific frequencies has been described in some detail, it will be realised that the noise measuring system described is not restricted to such choice of frequencies, nor to the precise arrangements described. For instance, the frequency 2S might be used in place of S for the modulator carrier frequency; the noise filter N(23) could be connected elsewhere in the output path of the amplifier, and other bands than the one selected could be chosen. The arrangements described are particularly favourable for a communication system employing a supervisory system of the known type described.

It may be mentioned finally that non-linear distortion and intermodulation in the main repeater amplifier A1 may be estimated by measuring the level of the second or third harmonic generated therein from a basic test frequency transmitted at suitable level over the cable. For example, if a test frequency of frequency 145 kc./s. be transmitted from the east terminal, this will pass through the repeater normally to the west terminal, but the second harmonic at 290 kc./s. generated in the amplifier A1 will be selected by the filter N, and, after frequency change in the modulator M(22) with the appropriate carrier test frequency S, can be measured at the west terminal in the same way as the noise. Alternatively, a test signal of frequency about 97 kc./s. can be transmitted from the west terminal, the third harmonic of which, at 291 kc./s., passes through the filter N, as before, and is measured at the west terminal.

For these measurements, the test signals would be transmitted at various relatively high levels in order to create the most unfavourable conditions for the amplifier, and therefore a more sensitive test.

Information on intermodulation effected by the line amplifier may additionally be obtained by sending a carefully selected pair or more of test frequencies, and measuring the level generated of a specific harmonic combination of these frequencies.

It is to be understood that the foregoing description of specific examples of this invention is not to be considered as a limitation on its scope.

What we claim is:

1. In a carrier current communication system for transmitting signals within a predetermined transmission frequency range between a first station and a second station over a transmission line interconnecting said stations and including a plurality of serially related repeaters each having a separate indexing frequency assigned thereto, means in the first station for transmitting an indexing frequency over said line to a selected repeater having the corresponding indexing frequency assigned thereto, and means in the said selected repeater for responding to said transmitted indexing frequency to provide noise measurement information to said first station, the last said means including amplifier means for amplifying said indexing frequency, filter means for passing said amplified indexing frequency to the output of said repeater, means for selecting a narrow band of sample frequencies in the region above said predetermined transmission frequency range from the output of said amplifier means, means for modulating a frequency indicative of said amplified indexing frequency appearing on the output of said repeater with the said sample frequencies, means for deriving a side band frequency of said modulated frequencies lying within said predetermined frequency range, means for amplifying said side band frequency by said amplifying means and means for transmitting said amplified side band frequency to said first station.

2. A carrier current communication system as set forth in claim 1 wherein the signals transmitted from the said first station to the said second station lie within a first direction frequency band and the signals transmitted in the other direction lie within a second direction frequency band separated from said first direction frequency band and wherein the said indexing frequency lies in a frequency band between said first direction and said second direction frequency bands.

3. A carrier current communication system as set forth in claim 1, wherein said repeater includes frequency multiplying means, and wherein said frequency indicative of the said amplified indexing frequency appearing at the output of said amplifier comprises said indexing frequency multiplied by said multiplying means.

4. A carrier current communication system as set forth in claim 2 wherein said side band frequency lies within the said second direction frequency band.

5. A carrier current communication system as set forth in claim 1 wherein said frequency modulated by said sample frequencies is twice the said indexing frequency.

6. In a carrier current communication system as set forth in claim 1, means for frequency doubling said frequency appearing on said output of said repeater and auxiliary amplifier means for amplifying said doubled frequency for said modulation by said sample frequencies.

7. A carrier current communication system as set forth in claim 1 wherein circuit means comprising a symmetrical hybrid network and a low pass filter is provided for transferring said frequency indicative of said amplified indexed frequency to said means for modulating and wherein circuit means comprising a skew hybrid network and a high pass filter is provided for transferring said side band frequencies to said repeater for transmission to said first station.

References Cited in the file of this patent

UNITED STATES PATENTS

| | | |
|---|---|---|
| 2,784,264 | Hausen et al. | Mar. 5, 1957 |
| 2,890,296 | Ponthus et al. | June 9, 1959 |

UNITED STATES PATENT OFFICE

CERTIFICATE OF CORRECTION

Patent No. 3,059,068 October 16, 1962

William Jesse Frankton et al.

It is hereby certified that error appears in the above numbered patent requiring correction and that the said Letters Patent should read as corrected below.

In the heading to the printed specification, between lines 8 and 9, insert the following:

Claims priority, application Great Britain July 9, 1959

Signed and sealed this 9th day of April 1963.

(SEAL)
Attest:

ESTON G. JOHNSON
Attesting Officer

DAVID L. LADD
Commissioner of Patents